(12) United States Patent
Viault et al.

(10) Patent No.: US 11,137,021 B2
(45) Date of Patent: Oct. 5, 2021

(54) ROLLING BEARING RING BY METAL INJECTION MOLDING PROCESS

(71) Applicant: Aktiebolaget SKF, Gothenburg (SE)

(72) Inventors: Samuel Viault, Saint-Antoine-du-Rocher (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/420,646

(22) Filed: May 23, 2019

(65) Prior Publication Data

US 2019/0375020 A1 Dec. 12, 2019

(30) Foreign Application Priority Data

Jun. 6, 2018 (DE) .......................... 102018208947.7

(51) Int. Cl.
| | |
|---|---|
| *F16C 19/06* | (2006.01) |
| *F16C 33/62* | (2006.01) |
| *F16C 33/64* | (2006.01) |
| *B22F 5/10* | (2006.01) |
| *B22F 3/22* | (2006.01) |
| *B22F 3/24* | (2006.01) |

(52) U.S. Cl.
CPC .............. *F16C 19/06* (2013.01); *B22F 3/225* (2013.01); *B22F 3/24* (2013.01); *B22F 5/106* (2013.01); *F16C 33/62* (2013.01); *F16C 33/64* (2013.01); *B22F 2003/248* (2013.01); *B22F 2301/35* (2013.01); *F16C 2204/70* (2013.01); *F16C 2220/20* (2013.01)

(58) Field of Classification Search
CPC .......... F16C 19/06; F16C 33/62; F16C 33/64; F16C 2204/66; F16C 2204/70; F16C 2220/20
See application file for complete search history.

(56) References Cited

U.S. PATENT DOCUMENTS

| | | | |
|---|---|---|---|
| 3,782,794 A | * | 1/1974 | Chmura ................ F16C 33/585 384/492 |
| 5,168,841 A | | 12/1992 | Suzuki |
| 7,793,583 B2 | | 9/2010 | Radinger |
| 8,863,716 B2 | | 10/2014 | Dorn et al. |
| (Continued) | | | |

FOREIGN PATENT DOCUMENTS

| | | | |
|---|---|---|---|
| DE | 102010019531 | * | 11/2011 |
| EP | 2853698 A1 | | 4/2015 |
| (Continued) | | | |

OTHER PUBLICATIONS

TAI Special Steel, AISI 8620 Steel, May 30, 2016.*

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A rolling bearing providing a first ring and a second ring in relative rotation one each other, and at least one row of rolling elements being arranged between the said rings. At least one the rings is made by metal injection molding process including the successive steps of mixing a metal powder with a thermoplastic binder, forming a part by injection of the mixed powder in a closed die, debinding such a formed part in a furnace, sintering to densify the part, and quenching to set a ring hardness, to improve wear resistance and fatigue life.

11 Claims, 1 Drawing Sheet

(56) References Cited

U.S. PATENT DOCUMENTS

| | | | |
|---|---|---|---|
| 9,032,863 B2 | 5/2015 | Chambonneau | |
| 9,085,028 B2 | 7/2015 | Cha | |
| 9,541,134 B2 * | 1/2017 | Wensing | ................. F16C 33/32 |
| 9,732,797 B2 * | 8/2017 | Wensing | ................. F16C 33/62 |
| 2005/0274222 A1 | 12/2005 | Hwang | |
| 2006/0239851 A1 | 10/2006 | Nelles | |
| 2008/0190237 A1 | 8/2008 | Radinger | |
| 2014/0150602 A1 | 6/2014 | Hauvespre | |
| 2016/0273587 A1 * | 9/2016 | Beswick | ............... C22C 38/001 |

FOREIGN PATENT DOCUMENTS

| | | | |
|---|---|---|---|
| EP | 3054116 A1 | | 8/2016 |
| EP | 3121436 A1 | | 1/2017 |
| EP | 3173612 A1 | | 5/2017 |
| EP | 3181836 A1 | | 6/2017 |
| FR | 3000149 | * | 6/2014 |
| WO | 2010/139663 A1 | | 12/2010 |

* cited by examiner

ROLLING BEARING RING BY METAL INJECTION MOLDING PROCESS

CROSS-REFERENCE

This application claims priority to German patent application no. 102018208947.7 filed on Jun. 6, 2018, the contents of which is fully incorporated herein by reference.

TECHNOLOGICAL FIELD

The present invention relates to a rolling bearing, for use in any application with rotating parts, for example automotive vehicles, thermal and electrical motors, torque transmission devices.

BACKGROUND

A rolling bearing comprises a first ring and a second ring in relative rotation one each other, at least one row of rolling elements being arranged between the said rings.

The rings may be of solid type. A solid type is to be understood as a ring obtained by machining, grinding, from a metal tube shock, bar stock, rough forgings and/or roller blanks, to provide the ring final shape and dimensions. However, the manufacturing and material costs are intended to be decreased. The solid rings are of relatively important weight and, in many applications, it is desirable to reduce the rolling bearing weight. It is also desirable to use a manufacturing process less expensive and enabling complex shapes to the rings while keeping the load support function. Such solid-type rings may equip ball bearings of deep groove and types, roller bearings of toroidal, cylindrical, spherical, needle roller types, for example.

Alternatively, the rings may be stamped and cut from a metal blank sheet. A wide variety of ring shapes may be formed according to this manufacturing process, but limits the ability for supporting higher loads. Such rings may equip rolling bearings for clutch bearing units, steering units, suspension thrusts, for example.

SUMMARY

The aim of the invention is to overcome these drawbacks by proposing a rolling bearing having rings made by a process that permits shapes of high complexity.

To this end, the invention relates to a rolling bearing comprises a first ring and a second ring in relative rotation one each other, at least one row of rolling elements being arranged between the said rings.

According to the invention, at least one the rings is made by metal injection molding process including the successive steps of mixing a metal powder with a thermoplastic binder, forming a part by injection of the mixed powder in a closed die, debinding such a formed part in a furnace, sintering to densify the part, and quenching to set at least one of the rings hardness, to improve wear resistance and fatigue life.

Thanks to the invention, a ring for a rolling bearing of complex shape can me manufactured for use in a rolling bearing. The metal injection molding process prevents the use of additional secondary machining, and also prevents waste. The ring surfaces are fine without additional refining process step.

The ring density can be defined as high as necessary during the sintering step, and is suitable for use in a variety of rolling bearing applications.

According to further aspects of the invention which are advantageous but not compulsory, such a rolling bearing may incorporate one or several of the following features:

Rolling elements are rollers or needles.
Rolling elements are balls.
The metal powder is a steel alloy.
The metal powder is a steel alloy comprising chromium, molybdenum and high carbon through hardening steel. Advantageously, the metal powder is the steel alloy 100Cr6.
The metal powder is a steel alloy comprising nickel, chromium and molybdenum hardening steel. Advantageously, the metal powder is the steel alloy 21NiCrMo2.
The metal powder is an alloy of steel comprising nickel, carbon and molybdenum hardening steel. Advantageously, the metal powder is the steel alloy AISI 4620.
The limit of elasticity of at least one of the rings is comprised between 1000 MPa and 1500 MPa, and advantageously substantially equal to 1200 MPa.
The ultimate tensile strength of at least one of the rings is comprised between 1200 MPa and 1700 MPa, and advantageously substantially equal to 1500 MPa.
The ring is of surface roughness comprised between 250 and 830 Hv. The ring surface roughness is advantageously superior to 650 Hv on the rear abutment surface.
The process further comprises finishing operations of ring surfaces.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
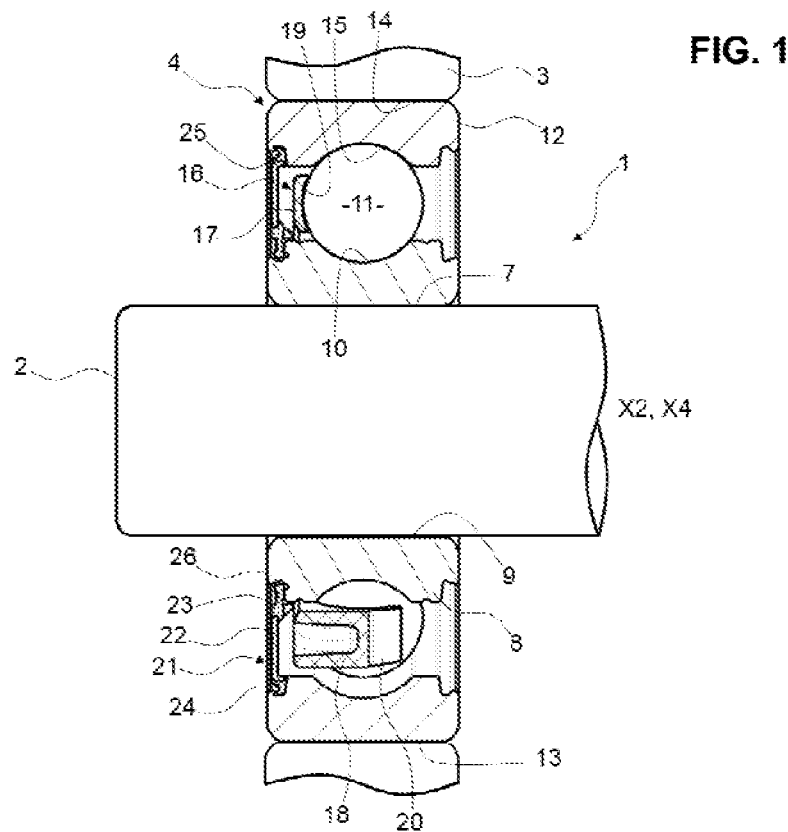
FIG. 1 is a sectional view of a deep groove ball bearing according to a first embodiment of the invention.

The FIG. 1 discloses a rotating bearing assembly 1. For example, assembly 1 may be used in an internal combustion engine of a motor vehicle, or in an electric motor.

Assembly 1 comprises a rotating shaft 2 of longitudinal rotating axis X2, a stationary housing 3, for example a stationary engine block, and a rolling bearing 4 to support in rotation said rotating shaft 2 with respect to said stationary housing 3.

The rolling bearing 4 is of deep groove ball bearing type and is of longitudinal rotating axis X4. Axis X4 and X2 are common.

Rolling bearing 4 comprises an inner ring 8 with an inner cylindrical bore 9. According to one embodiment, the inner ring 8 is rotating, bore 9 being mounted on an outer cylindrical surface 7 of a rotary shaft 2. Advantageously, inner ring 8 is press fitted onto shaft end but inner ring 8 can be securely fixed to said shaft end by any other suitable fixing means. Inner ring 8 is fastened in rotation with rotating shaft 2. Inner ring 8 further comprises an outer surface provided with a concave portion 10 forming an inner raceway for a plurality of rolling elements 11.

Rolling bearing 4 comprises an outer ring 12 with an outer cylindrical surface 13 mounted in a cylindrical bore 14 of stationary housing 3. Advantageously, outer ring 12 is press fitted into housing 3 but inner ring 12 can be securely fixed to said housing 3 by any other suitable fixing means. Outer ring 12 is stationary. Outer ring 12 further comprises an inner bore provided with a concave portion 15 forming an outer raceway for a plurality of rolling elements 11.

Alternatively, the inner ring 8 may be a stationary ring, the outer ring 12 being a rotating ring.

Rolling elements 11, here balls, are radially arranged between raceways 10, 15 of inner and outer rings 8, 12, respectively.

Rolling elements 11 are circumferentially maintained by a cage 16. Cage 16 comprises an annular heel 17 designed to be arranged axially on one side of the rolling elements 11 and radially between the outer surface of inner ring and the inner bore of outer ring. Cage 16 further comprises a plurality of projected portions 18 that axially extend from said annular heel 17. Projected portions 18 are formed integral with heel 17 and between them delimit pockets 19 in which the rolling elements 11 are housed. Projected portions 18 form separation walls between two circumferentially adjacent pockets.

Advantageously, each of the projected portions 18 can be axially extended on its free end by a claw 20 so as to snap rolling elements 11 in a pocket 19. Alternatively, projected portions do not comprise such claws, or only a limited number of projected portions of cage comprise claws.

In the illustrated embodiment, the rolling bearing 4 further comprises sealing means 21 provided on one axial side of the rolling bearing 4 towards the shaft end. According to an alternate embodiment, the rolling bearing 4 may comprise sealing means on both axial sides.

Sealing means 21 comprise a stiffening insert 22 and a sealing gasket 23.

Stiffening insert 22 is annular and extend radially. Sealing gasket 23 is fixed to said stiffening insert 22. Advantageously, stiffening insert 22 is made of metal, and sealing gasket is made of polymer material.

Sealing gasket 23 comprises an annular anchorage portion 24 on a first radial end. Anchorage portion 24 is fitted into an annular groove 25 provided in the inner bore of outer ring 12. Annular groove 25 is provided on one axial side of the outer raceway 15 for the rolling elements 11. According to the invention, groove 25 is on the axial side oriented towards the shaft end 16.

Sealing gasket further comprises an annular sealing lip 26 on a second radial end, opposite radially to said anchorage portion 24. Sealing lip 26 is in sliding contact with a portion of the outer surface of inner ring 8 on the axial side of inner raceway 10 oriented towards the shaft end 16. In the present embodiment, sealing lip 26 contacts an annular groove provided on the outer surface of inner ring 8. Alternatively, sealing lip 26 may contact an outer cylindrical surface of inner ring 8.

According to the invention, the inner rings 8 and the outer ring 12 of rolling bearing 4 are each made by metal injection molding process that includes the successive following steps.

A metal powder with a thermoplastic binder are mixed together. Mixing coats the metal powder particles with the binder, breaks up agglomerates and permits to obtain homogeneity of distribution of metal power particles and binder. Mixing is performed in any suitable mixing means, such as single or twin screw extruder, plunger extruder, double planetary mixer, twin cam mixer, for example. Advantageously, the metal powder is a steel alloy. According to a first embodiment, the metal powder is a steel alloy comprising chromium, molybdenum and high carbon through hardening steel. Advantageously, the metal powder is the steel alloy 100Cr6. According to a second embodiment, the metal powder is a steel alloy comprising nickel, chromium and molybdenum hardening steel. Advantageously, the metal powder is the steel alloy 21NiCrMo2. According to another embodiment, the metal powder is an alloy of steel comprising nickel, carbon and molybdenum hardening steel. Advantageously, the metal powder is the steel alloy AISI 4620.

A ring part is formed by injection of the mixed powder in a closed die. The mixed powder is progressively filled in a closed die, said die defining a hollow shape of the inner ring 8. The same applies for outer ring 12. The mixed powder fills the entire cavity without any void. The mixture of metal powder and binder being homogeneous, the metal powder and the binder are homogeneously distributed within said closed die. The mixed powder is filled in at pressure and temperature conditions suitable for the mixed powder composition. Furthermore, the temperature must be sufficient to the thermoplastic binder be aggregated with the metal power particles. The binder holds the metal particles together, but is unable to support stress, thermal gradients that could be applied to a rolling bearing 4 in some applications.

The thermoplastic binder is then removed from the ring material compound by debinding the formed part in a furnace. The debinding at high temperature is the preferred process instead of using solvent extraction processes. Indeed, the debinding by solvent extraction requires the immersion of ring in a fluid that dissolves the thermoplastic binder, and has the disadvantage for the present final application to leave an open-pore structure. On the contrary, the debinding in a furnace extracts the thermoplastic binder from the pores as a fluid, the thermoplastic binder passing to a liquid and/or vapor state under the effect of high temperature.

This debinding step is combined/followed by sintering the ring, the metal particles being heated and soldering to each other, also under the effect of high temperature. The homogeneity of the mixed powder during the mixing step and then the injecting step leads to a homogeneous sintered structure of ring material and at an acceptable density for the rolling bearing application, with controlled dimensions and properties. The exemplary embodiment of steel alloys 21NiCrMo2 and AISI 4620 permits to reach the desired ring characteristics.

The limit of elasticity of at least one of the rings is comprised between 1000 MPa and 1500 MPa, and advantageously substantially equal to 1200 MPa.

The ultimate tensile strength of at least one of the rings is comprised between 1200 MPa and 1700 MPa, and advantageously substantially equal to 1500 MPa.

The ring is then quenched to set at least one of the rings hardness, to improve wear resistance and fatigue life.

Applicants respectfully submit that no new matter is added to the application by the amendments to the specification.

Advantageously, the process may further comprise finishing operations on the ring surfaces, in particular on the raceways 10, 15.

The ring is of surface roughness comprised between 250 and 830 Hv. Advantageously, the surface roughness may be superior to 650 Hv to support high loads.

The present invention has been illustrated on the basis of a deep groove rolling bearing 4 for a rolling bearing assembly 1 which can for example be used in an internal combustion engine of a motor vehicle, or in an electric motor. It is also possible, without departing from the scope of the invention, to provide a rolling bearing with more than one row of rolling elements, with other types of rolling elements, and suitable for any other rolling applications.

Figure 2:
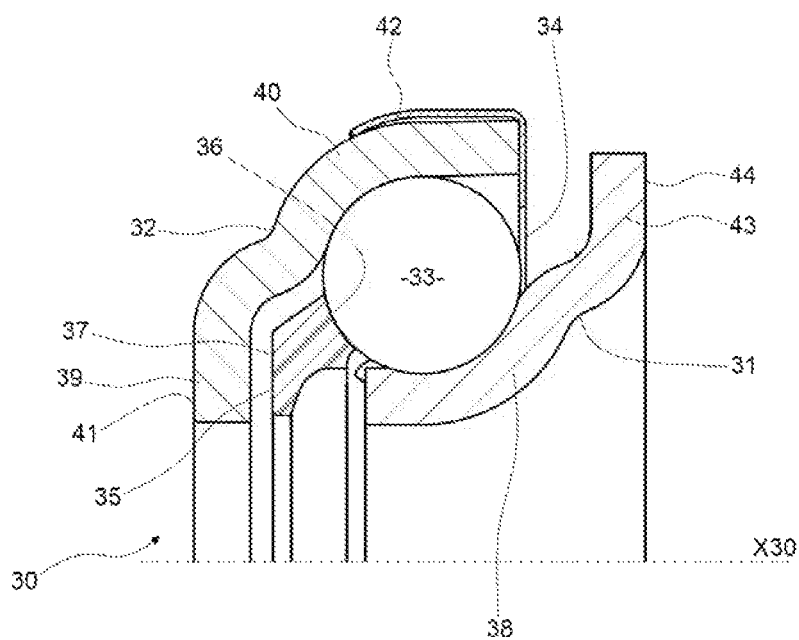
FIG. 2 is a sectional view along of a clutch bearing according to a second embodiment of the invention.

A second example of rolling bearing 30 is illustrated in the FIG. 2. Rolling bearing 30 is a clutch thrust bearing for use in a clutch bearing unit in the automotive applications. Said rolling bearing 30 is suitable for use in any other application with rotating movement.

The rolling bearing 30 is annular and centered on a central rotating axis X30. The ball bearing 30 comprises a fixed inner ring 31, a rotatable outer ring 32, and one series of balls 33 located in a raceway chamber 34 defined between the rings 31, 32. The balls 33 are circumferentially equally spaced and held by a cage 35, each of said balls 33 being arranged in a corresponding pocket 36 provided circumferentially to an annular heel 37. In the illustrated embodiment, the heel 37 is axially arranged between a free edge of a toroidal portion 38 of the fixed inner ring 31, and a radial portion 39 of the rotatable outer ring 32. A clutch thrust bearing 30 provided with balls 33 as rolling elements between rings 31, 32 is of reduced friction torque compared to other types of rolling bearings, provided with rollers or needles.

The rotatable outer ring 32 comprises a toroidal portion 40 of inner toroidal surface forming an outer raceway for the balls 33.

Advantageously, the rotatable outer ring 32 further comprises a radial portion 39 that outwardly radially extends from an inner side of said toroidal portion 40. Said radial portion 39 has an axial contact surface 41 suitable to actuate a coupling member (not represented), for example a diaphragm, to engage a clutch system of the vehicle.

Advantageously, the toroidal portion 40 of rotatable outer ring 32 is provided with a flange 42. Flange 42 has a tubular outer portion covering the toroidal portion 40, and a downwards radial projection that maintains the balls 33 in the rolling chamber 34.

The fixed inner ring 31 comprises a toroidal portion 38 of outside toroidal surface forming an inner raceway for the balls 33, and a radial portion 43 that outwardly radially extends from said toroidal portion 38. Said radial portion 43 has an axial contact surface 44 in axial abutment against an axially movable member (not illustrated). The ball bearing 4 is set in axial movement by the transmission of the movement of axially movable member to the axial contact surface 44 of fixed inner ring 31, and the transmitted to the clutch coupling member.

According to the invention, the inner ring 31 and the outer ring 32 of rolling bearing 4 are each made by metal injection molding process that includes the steps as previously described.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A rolling bearing comprising:
a first ring, and
a second ring in relative rotation to the first ring, and
at least one row of rolling elements being arranged between the first ring and the second ring, wherein at least one of the first ring and the second ring is made by a metal injection molding process, the at least one of the first ring and the second ring is a mixed combination of a metal powder and a thermoplastic binder, the at least one of the first ring and the second ring is formed by injection of the mixed powder in a closed die, the at least one of the first ring and the second ring which is formed by injection is debinded in a furnace, the at least one of the first ring and the second ring that is debinded in the furnace is sintered to densify and quenched to set a ring hardness in order to improve wear resistance and fatigue life thereof, the at least one of the first ring and the second ring having a limit of elasticity of 1200 MPa and a tensile strength of 1500 MPa.

2. The rolling bearing according to claim 1, wherein the metal powder is a steel alloy.

3. The rolling bearing according to the claim 2, wherein the metal powder is a steel alloy comprising chromium, molybdenum and carbon.

4. The rolling bearing according to claim 2, wherein the metal powder is a steel alloy comprising nickel, chromium and molybdenum.

5. The rolling bearing according to claim 2, wherein the metal powder is an alloy of steel comprising nickel, carbon and molybdenum.

6. The rolling bearing according to claim 1, wherein the metal powder is 100Cr6.

7. The rolling bearing according to claim 1, where the first ring includes a toroidal portion and an outer surface extending along the toroidal portion, and the roller bearing further comprises a flange, the flange having a tubular outer portion which overlies and contacts a portion of the outer surface along the toroidal portion and a radial portion which extends radially inward from the outer tubular portion to prevent the at least one row of rolling elements from leaving a rolling chamber defined by the first ring and the second ring and moving axially past the radial portion of the flange.

8. A rolling bearing comprising:
a first ring, and
a second ring in relative rotation to the first ring, and
at least one row of rolling elements being arranged between the first ring and the second ring, wherein at least one of the first ring and the second ring is made by a metal injection molding process, the at least one of the first ring and the second ring is a mixed combination of a metal powder and a thermoplastic binder, the metal powder being 21NiCrMo2, the at least one of the first ring and the second ring is formed by injection of the mixed powder in a closed die, the at least one of the first ring and the second ring which is formed by injection is debinded in a furnace, the at least one of the first ring and the second ring that is debinded in the furnace is sintered to densify and quenched to set a ring hardness in order to improve wear resistance and fatigue life thereof, the at least one of the first ring and the second ring having a limit of elasticity of 1200 MPa and a tensile strength of 1500 MPa.

9. The rolling bearing according to claim 8, where the first ring includes a toroidal portion and an outer surface extending along the toroidal portion, and the roller bearing further comprises a flange, the flange having a tubular outer portion which overlies and contacts a portion of the outer surface along the toroidal portion and a radial portion which extends radially inward from the outer tubular portion to prevent the at least one row of rolling elements from leaving a rolling chamber defined by the first ring and the second ring and moving axially past the radial portion of the flange.

10. A rolling bearing comprising:
a first ring, and
a second ring in relative rotation to the first ring, and
at least one row of rolling elements being arranged between the first ring and the second ring, wherein at least one of the first ring and the second ring is made by a metal injection molding process, the at least one of the first ring and the second ring is a mixed combination of a metal powder and a thermoplastic binder, the metal powder being AISI 4620, the at least one of the first ring and the second ring is formed by injection of the mixed powder in a closed die, the at least one of the first ring and the second ring which is formed by injection is debinded in a furnace, the at least one of the first ring and the second ring that is debinded in the furnace is sintered to densify and quenched to set a ring hardness in order to improve wear resistance and fatigue life thereof, the at least one of the first ring and the second ring having a limit of elasticity of 1200 MPa and a tensile strength of 1500 MPa.

11. The rolling bearing according to claim 10, where the first ring includes a toroidal portion and an outer surface extending along the toroidal portion, and the roller bearing further comprises a flange, the flange having a tubular outer portion which overlies and contacts a portion of the outer surface along the toroidal portion and a radial portion which extends radially inward from the outer tubular portion to prevent the at least one row of rolling elements from leaving a rolling chamber defined by the first ring and the second ring and moving axially past the radial portion of the flange.

* * * * *